Jan. 11, 1938. G. H. REVERMAN 2,104,951
DISPLAY DEVICE
Filed July 16, 1937
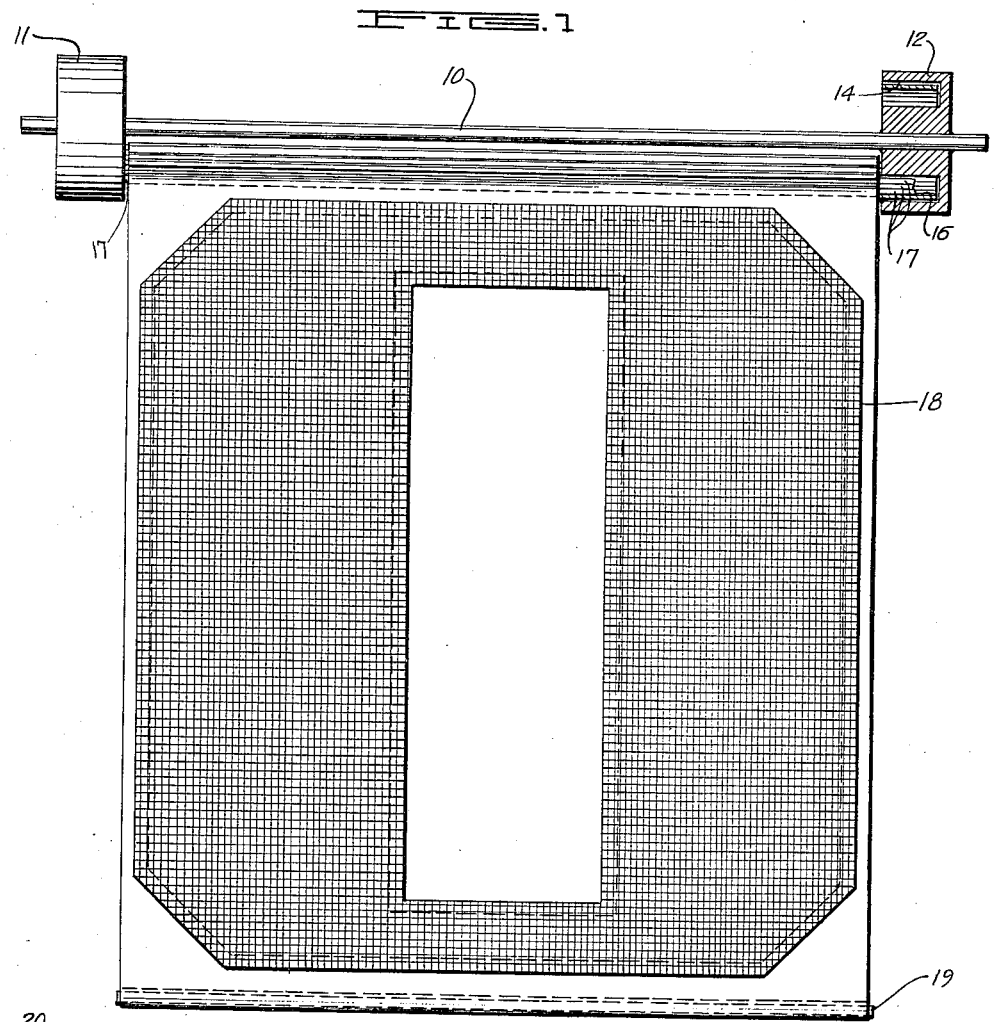
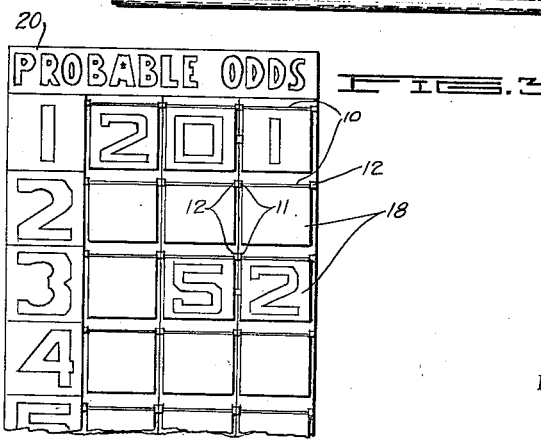
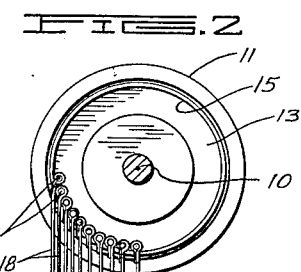
INVENTOR.
George H. Reverman
BY John A. Bommhardt
ATTORNEY.

Patented Jan. 11, 1938

2,104,951

UNITED STATES PATENT OFFICE 2,104,951

DISPLAY DEVICE

George H. Reverman, Miami, Fla.

Application July 16, 1937, Serial No. 154,035

1 Claim. (Cl. 40—72)

This invention relates to a display device for exhibiting rows of numbers or the like in any selected relation to each other, the displays being variable to serve various conditions.

A particular use of the invention is to post or display betting odds on each horse at a horse race, the selections and postings being quickly made to serve the various conditions. The horses may be indicated on the board by numbers, and the odds for each horse will be posted in line with the respective horses or numbers by which they are designated.

One form of the invention is illustrated in the accompanying drawing in which:

Fig. 1 is a front elevation of one of the display devices.

Fig. 2 is an enlarged view of the inside face of one of the end spools and rotating panels, parts being broken away.

Fig. 3 is a partial front view illustrating the method of using a plurality of the devices in an assembled position as a board for the desired purpose.

Referring to the illustrations;—a shaft 10 has mounted upon opposed ends thereof and secured thereto, a pair of spools 11 and 12 which are recessed at 13 and 14 respectively to form annular grooves, and mounted therein are rings 15 and 16 which are free and rotatable within said recesses or grooves.

A plurality of rotatable rods 17 have panels or leaves 18 attached therearound of cloth, thin metal, leather or the like, said panels dropping downward from the rods 17 between the spools 11 and 12; and the ends of the rods rest on the rings 15 and 16 in the grooves. The panels are preferably of black material (or paint on the metal) and have a numeral in white in the center thereof as shown by the drawing. A metal rod 19 is secured to the bottom of each panel 18, to insure the weight necessary to hold the panel smoothly suspended from the rod 17. 20 is a recessed board or sheet in which the units are mounted.

To illustrate the method of using this device in a group of units, a probable odds board is shown in Fig. 3, wherein horse No. 1 is indicated at odds of 20 to 1 said odds being shown by the units in series of three in a row following the horse numbers, 1, 2, 3 etc.

Each device or unit consisting of a series of rods 17 having panels 18 attached thereto, each with a single numeral ranging from 0 to 9, thus if the first horse shows probable odds of 20 to 1, the first panel following horse one, would be turned to 2, the second panel to 0 and the third panel to 1 as illustrated in Fig. 3.

If, however, the horse shows odds of only 5 to 2, the first panel shows no numeral, the second panel shows a 5 and the third panel a 2 as shown in Fig. 3 by horse three.

The panels 18 are rotated by hand, the ends of the rods 17 revolving smoothly and rapidly within the recesses 13 and 14 in the spools 11 and 12, the said rod ends bearing on the inner surface of the rings 15 and 16.

To exhibit any particular number the panels or leaves of the desired unit are swung around or flipped over to expose the desired panel and number, the ends of the rods 17 traveling around the rings 15 and 16, the flexibility of the material of the panels permitting them to bend or swing under the panels of the row above, which will also swing out to allow them to pass each other. The front panel, showing the number desired, conceals the panel behind it.

I claim:

The combination with a board having a row of fixed numbers thereon, of a series of display devices, arranged on the board in line with the numbers of the row respectively, each device comprising a pair of spools having annular grooves on their inner faces and freely rotatable metal rings fitting loosely in said grooves and a set of hinged panels supported in overlapping relation on the board and movable behind or in front of each other to expose any desired panel, the panels having rods at the top which fit loosely on the rings in said grooves.

GEORGE H. REVERMAN.